(12) United States Patent
Harrison et al.

(10) Patent No.: US 12,319,149 B2
(45) Date of Patent: Jun. 3, 2025

(54) APPARATUS AND PROCESS TO CONTROL A DRIVE ASSEMBLY

(71) Applicant: FERRARI S.p.A., Modena (IT)

(72) Inventors: Christopher Harrison, Modena (IT); Stefano Varisco, Modena (IT)

(73) Assignee: FERRARI S.p.A., Modena (IT)

( * ) Notice: Subject to any disclaimer, the term of this patent is extended or adjusted under 35 U.S.C. 154(b) by 449 days.

(21) Appl. No.: 17/840,881

(22) Filed: Jun. 15, 2022

(65) Prior Publication Data

US 2022/0402372 A1 Dec. 22, 2022

(30) Foreign Application Priority Data

Jun. 17, 2021 (IT) .................. 102021000015851

(51) Int. Cl.
*B60L 15/20* (2006.01)
*B60K 7/00* (2006.01)

(52) U.S. Cl.
CPC ........ *B60L 15/2045* (2013.01); *B60K 7/0007* (2013.01); *B60K 2007/0061* (2013.01)

(58) Field of Classification Search
CPC ............. B60L 15/2045; B60K 7/0007; B60K 2007/0061
See application file for complete search history.

(56) References Cited

U.S. PATENT DOCUMENTS 12,109,891 B2 * 10/2024 Justus .................. B60R 16/03
2016/0250930 A1 * 9/2016 Collins ............... B60L 15/2036
701/22

FOREIGN PATENT DOCUMENTS

EP 2783906 A1 10/2014
KR 20190067098 A * 6/2019 ............ B60W 10/18

OTHER PUBLICATIONS

Search Report for Italian Application No. 102021000015851, completed Mar. 9, 2022, 8 pages.

* cited by examiner

*Primary Examiner* — Bryan A Evans
(74) *Attorney, Agent, or Firm* — CANTOR COLBURN LLP

(57) ABSTRACT

A process to control a drive assembly includes the steps of providing a mathematical model associating a first quantity indicative of a torque delivered by a motor-generator with a second quantity indicative of a linear acceleration of a wheel hub unit, which receives the torque, acquiring a first signal indicative of the second quantity, determining a target signal of the first quantity by means of the mathematical model based on the acquired first signal, so that the torque indicated by the target signal involves at least a decrease in a difference between the second quantity and a reference, and controlling the motor-generator according to the determined target signal.

12 Claims, 3 Drawing Sheets

APPARATUS AND PROCESS TO CONTROL A DRIVE ASSEMBLY

CROSS-REFERENCE TO RELATED APPLICATIONS

This patent application claims priority from Italian patent application no. 102021000015851 filed on Jun. 17, 2021, the entire disclosure of which is incorporated herein by reference.

TECHNICAL SECTOR

The invention relates to an apparatus and a process to control a drive assembly of a vehicle.

PRIOR ART

Vehicles are notoriously driven by means of drive assemblies, which each include an axle and a pair of wheel hubs carried in a rotary manner around their own axes of the axle. The wheel hubs carry, in turn, the tyres in a fixed position.

The axle and the wheel hubs are caused to rotate by means of a least one motor that is part of the drive assembly. In some cases, the motor is an electric motor-generator, which can be carried by the axle or even by a wheel hub in a fixed position.

Furthermore, each drive assembly also includes a suspension, which couples the wheel hubs to the frame of the vehicle in a movable or suspended manner along several directions.

More precisely, the movement that can be made by the wheel hubs relative to the frame can generally be expressed by means of two motion components, one of them being oriented longitudinally, namely horizontally along the driving direction of the vehicle, the other one being oriented vertically.

The suspension can be designed to elastically yield to a greater or smaller extent according to the directions of the motion components, based on the type of vehicle.

Furthermore, the suspension usually comprises shock absorber devices to damp the motion components.

Hence, the wheel hubs are subjected to stresses due to the contact between the tyres and the road and dynamically respond to said stresses by moving relative to the frame, according to the aforesaid directions, as a function of the features of the suspension, namely based on its stiffness and on the configuration of the shock absorber devices.

Therefore, the dynamic response of the wheel hubs is a fixed function of the stresses, based on the design conditions of the vehicle. For example, the function can be described or represented by means of an approximated—more precisely, linearized—dynamic mathematical model. In case of a linearization, the function can also be expressed in a frequency domain by means of a corresponding transfer function.

Generally speaking, the dynamic response of the wheel hubs, namely their movement relative to the frame, needs to be adjusted to stresses while the vehicle is travelling.

Furthermore, the dynamic response needs to be adjusted in an efficient manner from an energy point of view as well as in a simple manner.

More specifically, the dynamic response has to be adjusted without changing the configuration of the suspension.

The object of the invention is to fulfil at least one of the needs discussed above.

DESCRIPTION OF THE INVENTION

The aforesaid object is reached by an apparatus and a process to control a drive assembly as claimed in the appended claims.

BRIEF DESCRIPTION OF THE DRAWINGS

The invention will be best understood upon perusal of the following detailed description of a preferred embodiment, which is provided by way of non-limiting example, with reference to the accompanying drawings, wherein.

EMBODIMENTS OF THE INVENTION

Figure 1:
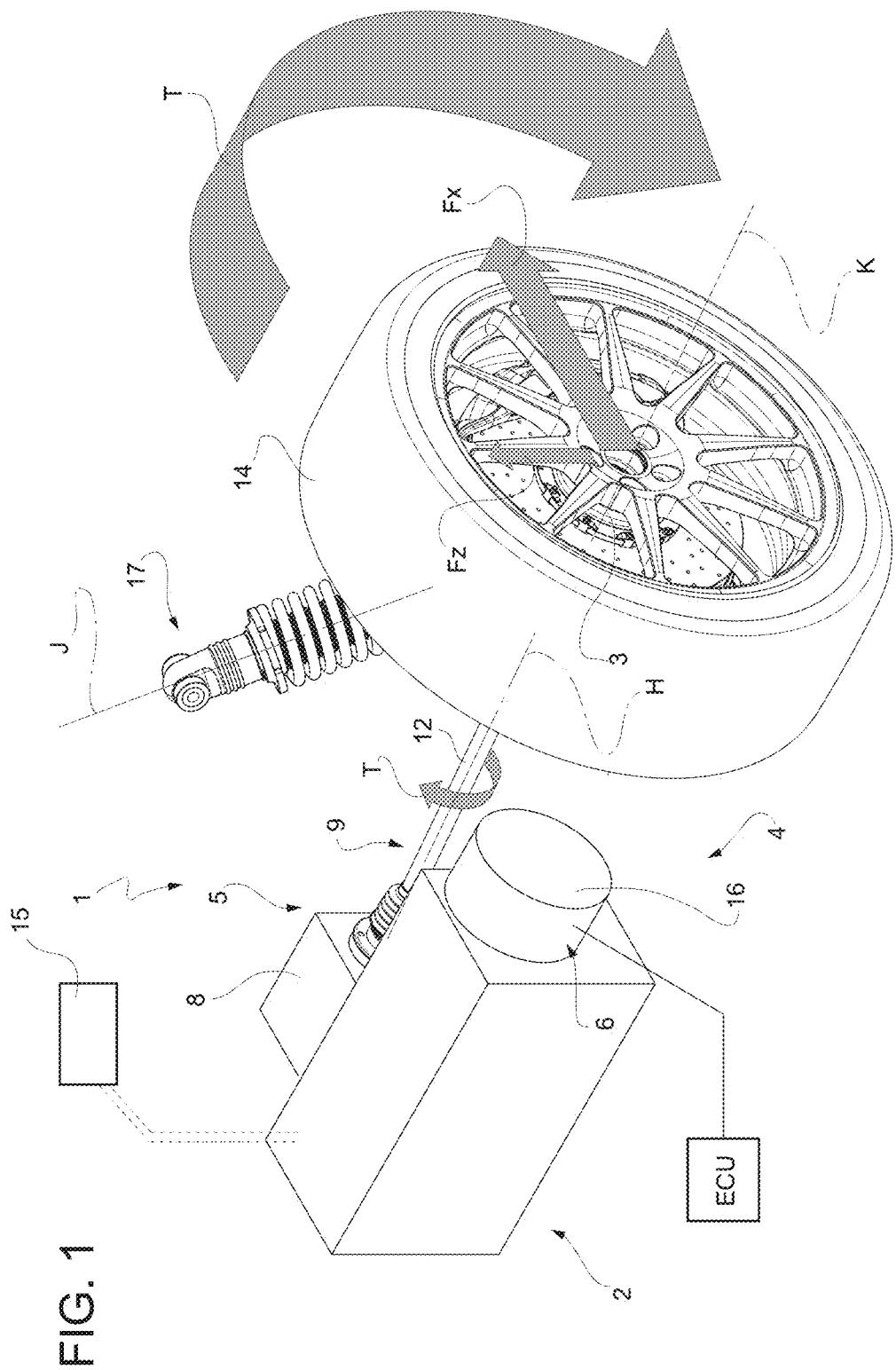
FIG. 1 shows a drive assembly of a vehicle comprising an apparatus according to a particular embodiment of the invention.

In FIG. 1, reference number 1 is used to indicate, as a whole, a vehicle.

The vehicle 1 comprises a drive assembly 2, which, in turn, comprises:
a frame (not shown),
a wheel hub unit 3,
a suspension 4, which couples the wheel hub unit 3 to a frame portion,
a drive axle 5, which is coupled to the wheel hub unit 3, and
an electric motor-generator 6.

The axle 5 substantially extends along an axis H, in particular orthogonal to the driving direction of the vehicle 1.

More in detail, the axle 5 comprises a fixed portion 8, which is fixed relative to the frame, and an axle shaft 9, which is supported by the portion 8 in a rotary manner and is coupled to the wheel hub 3. For example, the portion 8 houses a known drivetrain, which is not shown herein and to which the axle shaft 9 is coupled in order to receive the rotary motion.

Figure 2:
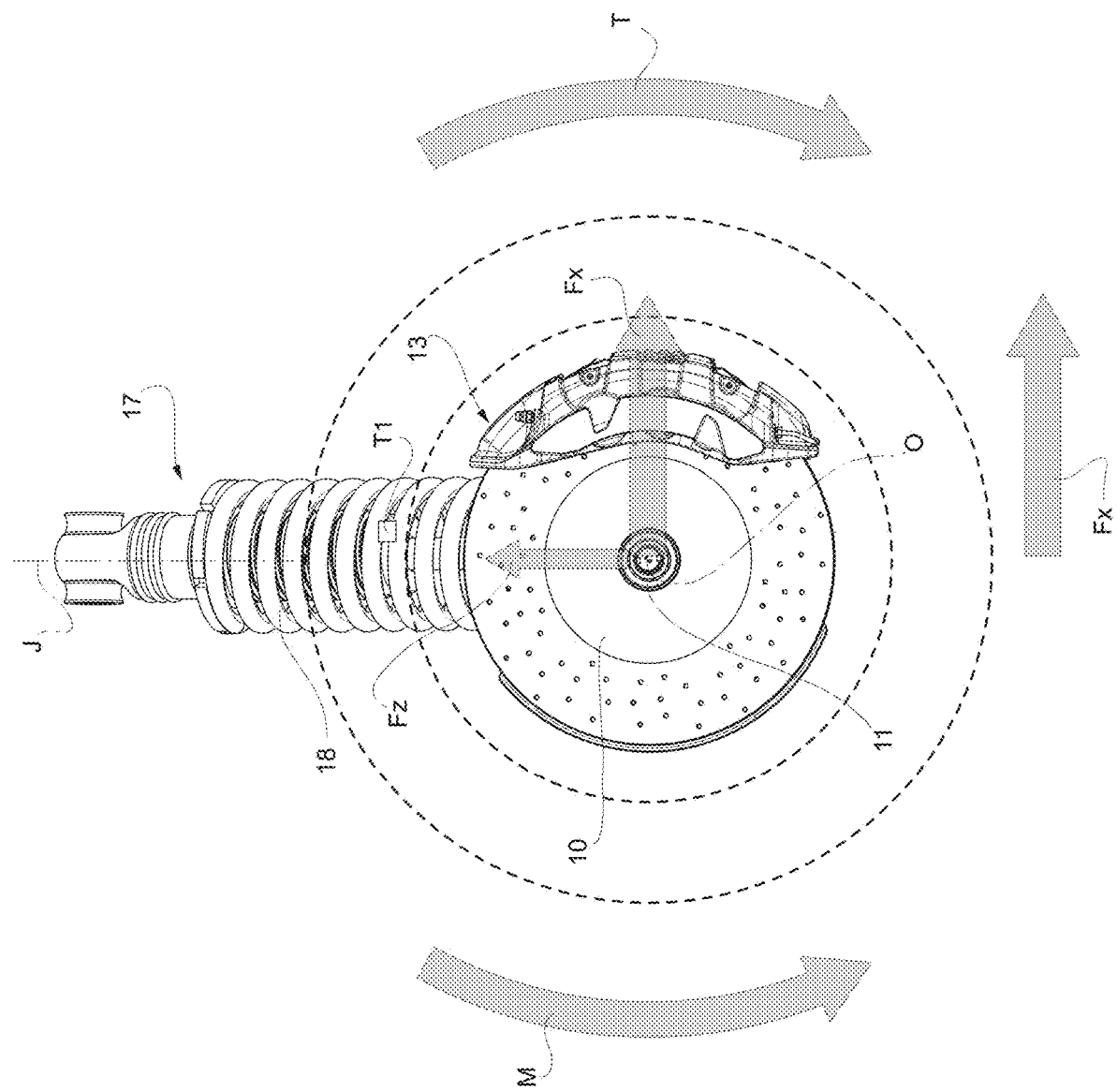
FIG. 2 is a side view of the assembly of FIG. 1.

On the other hand, according to FIG. 2, the wheel hub 3 comprises a cage 10 and a hub 11 supporting the cage 10 in a rotary manner around a horizontal axis K, which is transversal to a driving direction of the vehicle 1. In particular, the outer cage 10 carries a known braking device 13. The hub 11 specifically carries a wheel 14 of the vehicle 1 in a fixed position. The wheel 14 is in contact with the road.

The axle shaft 9 is connected to the wheel hub unit 3 and is configured to cause the rotation of the hub 11 and, hence, specifically, of the wheel 14, thus causing the vehicle 1 to move; more precisely, the axle shaft 9 comprises a shaft 12 and a joining device, for example of a known type, which couples the shaft 12 to the hub 11. The joining device is configured to transmit a torque on the shaft 12 to the hub 11 around the axis K.

The wheel hub unit 3 has a centre defined by a point O of the axis K. The torque transmitted to the hub 11 acts around the axis K and the point O.

The motor-generator 6 comprises a casing 16 carried by the axle 5, more precisely by the portion 8, in a fixed position.

The casing 16 contains a stator and a rotor of the motor-generator 6. The rotor is coupled to the axle 5, more in detail to the axle shaft 9, through the drivetrain housed in the portion 8. The drivetrain is part of the drive assembly 2 and is configured to transmit a torque of the rotor to the axle 5, which, in turn, transmits the torque to the wheel hub unit 3. More precisely, the drivetrain transmits the torque of the rotor to the axle shaft 9, which, in turn, transmits the torque to the hub 11.

In this way, the motor-generator 6 can be controlled so as to deliver a torque T to the wheel hub unit 3, in particular through the axle 5. In other words, the motor generator 6 exerts a torque upon the axle 5, which, in turn, transmits the torque T depending on the torque exerted by the motor-generator 6 to the wheel hub unit 3.

The torque T is the torque actually delivered to the wheel hub 3 by the motor generator 6. In particular, the torque T directly depends on the torque actually delivered or outputted by the motor-generator 6, more in particular according to a two-way relationship, assuming that torque transmission losses are negligible or at least constant.

The torque T can be positive, namely a drive torque, when the motor-generator 6 acts as motor, or negative, namely a torque countering the movement of the vehicle 1, when the motor-generator 6 acts as generator.

The drive assembly 2 further comprises a power storage device 15, such as, for example, a battery. The motor-generator 6 is connected to the power storage device 15 to receive electrical power when it acts as motor and to store electrical power when it acts as generator. Specifically, the storage device 15 is carried by the frame in a fixed position.

According to an alternative embodiment which is not shown herein, the motor-generator 6 is carried by a wheel hub unit 3, more precisely by the cage 10, in a fixed position. In this case, the transmission device is configured to transmit the torque of the rotor to the wheel hub unit 3, more in detail to the hub 11, preferably in a direct manner, namely without necessarily going through the axle 5. Here, the torque T can coincide with the torque actually delivered or outputted by the motor-generator 6, namely with the torque of the rotor.

In any case, in general, the torque T remains the torque actually delivered to the wheel hub 3 by the motor generator 6.

The suspension 4 has a known architecture and comprises, in particular, a damping device 17 between the frame and the wheel hub unit 3, more in detail between the frame and the cage 10. The damping device 17 comprises a shock absorber, which extends along an axis J skew relative to the axis K and having at least one vertical component. The shock absorber has two ends, which are opposite one another along the axis J and are coupled to the frame and to the wheel hub unit 3, in particular to the cage 10, respectively. Conveniently, the damping device 17 also comprises an elastic element 18 to elastically suspend the wheel hub unit 3 relative to the frame, for example a cylindrical or conical spring around the axis J.

During the operation of the drive assembly 2, the wheel 14 is in contact with the road, so that it receives a stress, for example due to an obstacle in front of the wheel 14, such as an artificial bump. This stress can ideally be divided into a force Fx oriented along the driving direction of the vehicle 1 and a force Fz vertically oriented upwards. The force Fx causes a torque M around the axis K and the point O. Said torque M is equal to the force Fx by an arm defined by the radius of the wheel 14.

The torque T delivered by the motor-generator 6 is released to the road through the wheel 14, thus generating forces that algebraically add to the forces Fx, Fz. Therefore, two resulting forces Fx' and Fz' are obtained as a function of at least of the torque T (especially of its sign), of the conformation of the road and of the operating conditions of the wheel 14.

The wheel hub unit 3 and, in particular, the point O have a dynamic response to the forces Fx' and Fz', affected by the modulus and by the sign of the torque T.

The dynamic response can be expressed in terms of an acceleration vector or linear acceleration, namely even a simple linear acceleration component, which defines anyway a linear acceleration. The linear acceleration corresponds to the forces Fx' e Fz', or even to the sole force Fx', as a function of the architecture of the suspension 4, in particular according to corresponding Euler-Lagrange equations.

In particular, the linear acceleration comprises at least one relative acceleration component relative to the frame or, more in particular, is defined by said relative acceleration component.

The linear acceleration can ideally be broken out into a plurality of linear acceleration components; in particular, the linear acceleration has at least one longitudinal component Ax, namely oriented horizontally along the driving direction of the vehicle 1. Furthermore, there can also be a component Aj along the axis J, based on the architecture of the suspension 4.

The longitudinal component Ax comprises, in particular, a relative sub-component relative to the frame or, more in particular, is entirely relative with respect to the frame.

The vehicle 1 comprises an apparatus to control the drive assembly 2. The apparatus comprises a control unit ECU programmed to implement a process to control the drive assembly 2.

The control unit ECU is connected to the motor-generator 6 and is configured to control the latter, in particular to control the torque T delivered by it to the wheel hub unit 3. Alternatively, the control unit ECU could control the angular speed of the rotor, thus indirectly controlling the torque T according to the mechanical characteristic of the motor-generator 6 (torque-speed or power-speed curve).

The control unit ECU stores a mathematical model, which associates a first quantity indicative of the torque T, for example the torque T itself or a corresponding electrical quantity (e.g. voltage or current), with a quantity indicative of a linear acceleration of a point of the wheel hub unit 3, in particular of the point O, for example considered as part of the cage 10.

The linear acceleration indicated by the second quantity comprises, in particular, a relative component relative to the frame or, more in particular, is defined by the relative component relative to the frame.

The first quantity is indicative of the torque T actually delivered to the wheel hub unit 3 by the motor-generator 6.

The second quantity, which could even directly be the linear acceleration, can be measured, for example, by means of a transducer T1, in particular coupled to the wheel hub unit 3, more specifically to the cage 10. Otherwise, the second quantity could be estimated by the control unit ECU starting from other measured quantities, for example from a speed of the point, according to a further model or physical law stored by the control unit ECU. For instance, the estimation can take place by means of a deterministic or statistical observer.

Specifically, the drive assembly 2 comprises the transducer T1, which is, for example, an accelerometer or, if necessary, an inertial measuring unit. More specifically, the transducer T1 is directly attached to the cage 10.

The transducer T1 is configured to detect the second quantity, for example an electrical quantity, such as a current or a voltage, and to generate a signal S1 concerning the second quantity. The signal S1 is, in other words, an indicative signal, in this specific case a measured signal, of the second quantity.

The control unit ECU is configured to acquire the signal S1, which could even be not directly measured by means of the transducer T1, but could be estimated, as explained above.

In any case, in the light of the above, the second quantity conventionally is an output of the aforesaid mathematical model.

Without losing in generality, the following description will relate to a linear acceleration consisting of the sole longitudinal component Ax, even though the following technical teaches can be applied, in a similar manner, with respect to any side acceleration component or to any combination of side acceleration components, namely to any side acceleration vector. In particular, the longitudinal component Ax can conceptually be replaced by the component Aj, for example.

Therefore, the second quantity specifically is indicative of the longitudinal component Ax.

In particular, any linear acceleration component or component combination comprises a relative sub-component relative to the frame or can be entirely relative with respect to the frame.

The mathematical model of the control unit ECU is a dynamic model, namely in the independent time variable, for example expressible in the state space, specifically according to the following state and output equations:

$$\dot{x}=Ax+Bu$$

$$y=Cx=Du$$

wherein A, B, C, D define the matrices of the model, whose elements are constant over time and dependent on the architecture of the suspension 4. x, u, y are the state, the input and the output, respectively, of the model, all as a function of time. Preferably, the matrix D is a zero matrix.

Specifically, the input, also called control, is defined by the first quantity, in particular the torque T. As mentioned above, the output is defined by the second quantity, in particular the linear acceleration Ax.

In particular, the state comprises the second quantity (linear acceleration Ax). More in particular, the state comprises the second quantity and its time integral (linear speed Vx). In other words, the state comprises a third quantity indicative of a linear speed of the point of the wheel hub unit 3.

The mathematical model could be different from the one expressed in the state space. For example, the model could be expressed in a frequency domain, for example by means of a transfer function in a linear system. In any case, the mathematical model can be provided to the control unit ECU in different ways; for example, the mathematical model can be a theoretical model based on the knowledge of the architecture of the suspension 4 or also a model identified starting from experimental data, for example by means of known model identification techniques.

The mathematical model could also include a modelling of noises and disturbances due to the wheel-road contact.

The control unit ECU is configured to determine a target signal S2 of the first quantity, namely of the input or control, by means of the mathematical model based on the signal S1. Since the signal S2 is of the first quantity, the signal S2 is indicative of the torque T, which, in particular, will actually be delivered to the wheel hub unit 3. Furthermore, the signal S2 is determined or mathematically calculated so that or as a function of a target defined by the fact that the indicated torque T leads at least to a decrease in a difference between the second quantity and a reference.

In other words, this means that the signal S2 is the result of a mathematical or logic operation coinciding with the solution of a mathematical problem, namely an operative search problem, in which a signal S2 causing the decrease in the difference is searched.

A person skilled in the art known mathematics and, therefore, is able to identify at least one known mathematical method to solve the operative search problem. For example, a suitable method could include a recursive calculation based on basic mathematical operations, for example in case the mathematical model is sufficiently simple to permit this calculation.

Herein, specifically, the reference is a null scalar or vector, so that the indicated torque T is such as to cause a decrease in the modulus of the linear acceleration. Otherwise, the reference could also be built based on a desired linear acceleration, namely on a desired dynamic response of the wheel hub unit 3. In this case, the state x could conveniently comprise the difference between the linear acceleration Ax and the reference, rather than the linear acceleration Ax by itself. Preferably, the reference is stored in the control unit ECU.

In order to be clear, in this description, the term "target signal" includes the concept of "set-point".

Therefore, in other words, the control unit ECU uses the stored or anyway acquired link between the first and the second quantity to identify a time signal (the signal S2), which allows the dynamic response of the wheel hub unit 3 to get close to a desired behaviour, possibly advantageous for the efficiency of the suspension 4 and/or for the comfort of a driver of the vehicle 1.

Preferably, the signal S2 is determined for a finite time horizon or time range.

In this way, the control unit ECU controls the motor-generator 6 according to the determined signal S2. In particular, the control unit ECU controls the motor-generator 6 in an open loop fashion, directly controlling the moor-generator 6 with the signal S2. Otherwise, a closed-loop control is possible, using the signal S2 as a reference to be compared with a feedback signal of the first quantity.

If the signal S2 is indicative of a timely succession of negative torque values T, the motor-generator 6 is controlled as a generator, so that a quantity of electrical power is advantageously regenerated and, specifically, stored in the storage device 15. Vice versa, if the signal S2 indicates a timely succession of positive torque values T, the motor-generator 6 is controlled as a motor, so that a quantity of electrical power is used and, specifically, taken from the storage device 15.

Optionally, the control unit ECU is configured preliminarily to check, namely before carrying out the control of the motor-generator 6 with the signal S2, whether the expected difference between the regenerated and used electrical power in the time range of the signal S2 is negative. In this case, the control unit ECU preferably does not carry out the control of the motor-generator 6 or re-determines a signal S2 so that the expected difference is zero or even positive.

Preferably, the control unit ECU can determine the signal S2 subject to the fulfilment of a condition, whereby the expected difference has to be zero or positive. This can happen in a direct manner, namely without the preliminary check.

For example, the fulfilment of the condition can be imposed by appropriately defining or re-defining, in case of the preliminary check, the aforesaid reference. Otherwise, as explained more in detail below, the fulfilment of the so formulated condition can be imposed in many ways known to a person skilled in the art, even though the formulation of the condition itself is not obvious, relative to the state of the art.

The determination of the signal S2 can take place in many specific ways and does not necessarily have to be optimal, namely obtained by means of a parametric numerical optimization process. Indeed, in case of a very simple mathematical model, the signal S2 could even be determined in an analytic manner or using heuristic methods, as long as the determined signals S2 indicates a torque T that is sufficient to cause a decrease in the difference between the second quantity and the reference.

Specifically, the signal S2 is determined by solving an optimal control problem based on the mathematical model and on a minimization of a cost function, wherein the cost function increases with the modulus of said difference between the second quantity and the reference.

More specifically, the cost function comprises a first contribution or addend increasing with said modulus.

For example, assuming from now on that the reference is zero (the extension to the case with a non-zero reference can directly be deduced without ambiguity), the first cost contribution could be defined by a time integral of the second quantity (linear acceleration Ax) raised to the square or by the square root of a mean of the second quantity raised to the square and the like.

In particular, the cost function increases at least or only for values of the first quantity that correspond to or indicate positive values of the torque T. This could even occur regardless of the existence of the first contribution.

More in particular, the cost function comprises a second cost contribution or addend increasing with said values of the first quantity. For example, the cost function could comprise a time integral of the first quantity multiplied by a sign function, which is zero for values of the first quantity corresponding to negative values of the torque T.

More in general, the cost function can comprise a plurality of cost contributions. Preferably, the cost function comprises a weighted sum of the cost contributions. In other words, each cost contribution is multiplied by a relative weight and then added to the other cost contributions multiplied by the corresponding weights.

Preferably, the optimal control problem defines a linear-quadratic problem (LQ problem), whereby the solution to the optimal control problem is provided by a linear-quadratic regulator (LQR). Herein, the mathematical model stored by the control unit ECU clearly is linear or linearized.

In this case, the cost function is, for example:

$$F = \int_{t_0}^{t_f} (x^T Q x + u^T R u) dt$$

wherein $t_0$ and $t_f$ are the ends of the finite time range, and wherein Q, R are the matrices of the regulator. F indicates the cost function. The matrices Q, R can be tuned in an appropriate manner, for example starting from simulations of the model or from experimental data.

The optimal solution of the linear-quadratic problem is well known and does not need to be described in detail. If necessary, the linear-quadratic problem can also be defined for an indefinite time.

Preferably, the control unit ECU is configured to filter a frequency contribution of the signal S1, before determining the signal S2 or during the determination thereof. The control unit ECU filters, namely attenuates, the frequency contribution that exceeds a given frequency band, in particular beyond 5 Hz. More specifically, the frequency band ranges from 8 Hz to 20 Hz, conveniently from 10 Hz to 15 Hz.

The filtering can take place in different ways. For example, the control unit ECU can directly apply a band-pass filter to the signal S1.

More conveniently, the filtering can indirectly take place with a frequency modelling of the optimal control problem. Indeed, the cost function can be defined in the frequency domain, namely transformed, for example by means of the Fourier transform. Hence, at least one of the weights relating to the cost contributions can be a function of the frequency, thus defining a filter for the corresponding contribution.

Clearly, in this case, the filter should conveniently attenuate the frequency contribution in the aforesaid frequency band, in order to disadvantage, in terms of costs, the frequency contribution exceeding the band itself.

In the specific case of the linear-quadratic problem, the cost function F is transformed, in an equivalent manner, in the frequency domain as follows, according to the known Parseval's theorem:

$$F = \frac{1}{2\pi} \int_{-\infty}^{+\infty} (x^T Q_1^T(j\omega) Q_1(j\omega) x + u^T R_1^T(j\omega) R_1(j\omega) u) d\omega$$

wherein the respective products of $Q_1$ and $R_1$ with their transposes provide the matrices Q and R, respectively. Therefore, $Q_1$ and $R_1$ define respective filters that can be properly tuned.

The optimal solution of the linear-quadratic problem, which, in this case, is frequency-modelled, is equally well known and does not need to be described in detail.

As to the possibility of introducing the condition on the difference between used and regenerated electrical power, this condition can be introduced by constraining the optimal control problem.

In particular, the minimization of the cost function can be subjected to the condition whereby the difference between the energy used and the energy regenerated by the motor-generator 6 in the time range of the signal S2 has to be greater than or equal to zero.

The condition, which is a function of the torque T and, therefore, of the input of the mathematical model, can directly be integrated in the cost function by means of Lagrange multipliers, for instance.

The link between the torque T and the electrical power, in particular, is defined by a mathematical model of the motor-generator 6, for example stored in the control unit ECU. Said mathematical model is generally known or, anyway, can be obtained by means of identification from experimental data.

To sum up, the process executed by the control unit ECU comprises the steps of:
  a) providing the mathematical model, which associates the first quantity, in particular indicative of the torque T actually delivered to the wheel hub unit 3, with the second quantity, in particular indicative of a linear acceleration of the point O comprising at least one relative linear acceleration component relative to the frame, b) acquiring the signal S1 indicative of the second quantity, c) determining the target signal S2 of the first quantity by means of the mathematical model based on the acquired signal S1, so that the torque T indicated by the target signal S2 leads to the decrease in the difference between the second quantity and the reference, and d) controlling the motor-generator 6 according to the S2.

Preferably, the process further comprises the step of e) filtering the frequency contribution of the signal S1 out of the selected frequency band.

Figure 3:
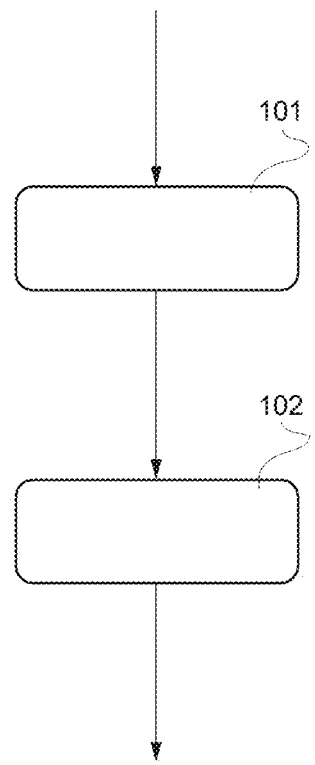
FIG. 3 is a block diagram showing steps of a process according to a particular embodiment of the invention.

FIG. 3 is a block diagram showing steps e) and c) of the process in sequence by means of the respective blocks 101 and 102. Indeed, step e) is carried out before or during step c).

Figure 4:
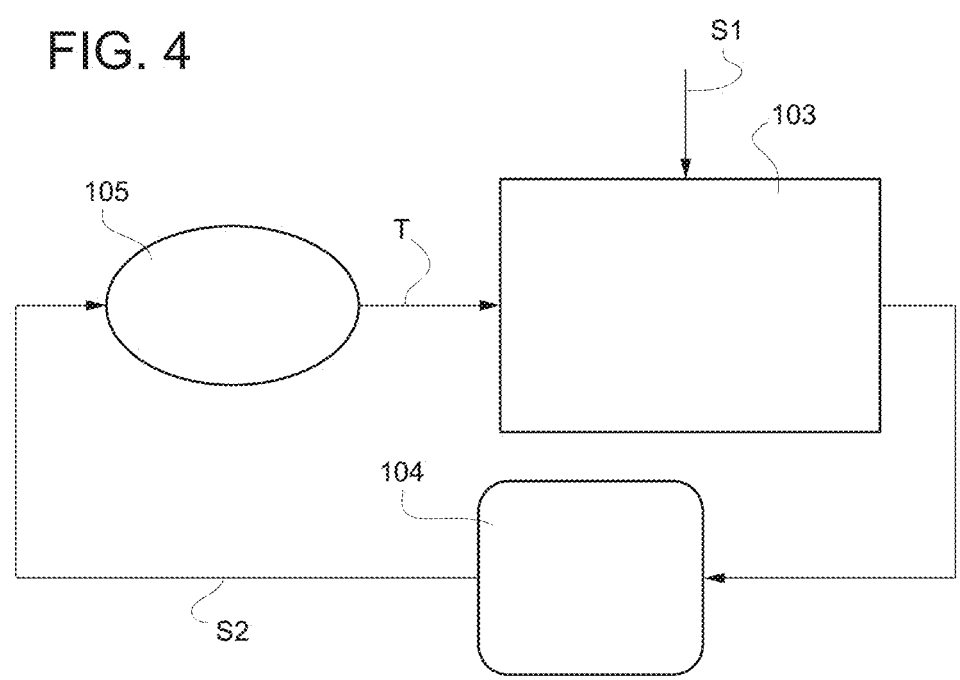
FIG. 4 is a block diagram showing a control diagram according to the process of FIG. 3.

FIG. 4 is a diagram of a particular embodiment of step c). Block 103 represents the dynamics of the wheel hub unit 3, namely the mathematical model stored by the control unit ECU, in particular expressed in the state space. Block 103 is inputted with the torque T and the signal S1. Block 103 outputs the state of the mathematical model.

Block 104 is inputted with the state and calculates as well as outputs the signal S2, solving the optimal control problem. The optimal signal S2 is the product of a matrix of optimal coefficients, minimizing the cost function, and the state outputted by block 103.

Bock 105 represents the control of the motor-generator 6. Block 105 is inputted with the optimal signal S2 and calculates as well as outputs the torque T according to the model of the motor-generator 6 and the control law applied.

Owing to the above, the advantages of the process and of the apparatus according to the invention are evident.

The motor-generator 6, which, in some case, is already present in hybrid or electric vehicles for the drive of the vehicles themselves, is used, herein, to reduce the peak-to-peak amplitude of the vibrations of the wheel hub unit 3, in particular through a reduction of the linear acceleration. In this way, the adjustment of the dynamic response of the wheel hub unit 3 is possible in a simple manner, with no need to introduce numerous components in the vehicle 1.

For example, the motor-generator 6 and the transducer T1 are sufficient, together with the control unit ECU, to carry out the process.

Thanks to the filtering operations of the frequency contribution of the signal S1, an optimal frequency band can be selected in order to ensure the comfort of the driver of the vehicle 1.

Finally, the process and the apparatus described and shown herein can clearly be subjected to changes and variants, which, though, do not go beyond the scope of protection set forth in the appended claims.

In particular, the optimal control problem can be formulated in any way deemed suitable, even using non-linear functions and/or functions in the frequency domain.

The invention claimed is:

1. A process to control a drive assembly (2) of a vehicle (1), the drive assembly (2) comprising
a wheel hub unit (3),
a suspension (4), which couples the wheel hub unit (3) to a frame portion of the vehicle (1),
a drive axle (5), which is coupled to the wheel hub unit (3), and
an electric motor-generator (6) having a casing (16), which is carried by the axle (5) or by the wheel hub unit (3), wherein the motor-generator (6) can be controlled so as to deliver a torque (T) to the wheel hub unit (3); the process comprising the steps of a) providing a mathematical model associating a first quantity indicative of said torque (T) delivered to the wheel hub unit (3) with a second quantity indicative of a linear acceleration (Ax) of a point (O) of the wheel hub unit (3), b) acquiring a first signal (S1) indicative of the second quantity, c) determining (102) a target signal (S2) of the first quantity by means of said mathematical model based on the acquired first signal (S1), so that the torque (T) indicated by the target signal (S2) causes at least a decrease in a difference between the second quantity and a reference, and d) controlling the motor-generator (6) according to the determined target signal (S2).

2. The process according to claim 1, wherein the target signal (S2) is determined by solving an optimal control problem based on said mathematical model and on a minimization of a cost function (F) increasing with the modulus of said difference.

3. The process according to claim 2, wherein the cost function (F) further increases for values of the first quantity that correspond to positive values of said torque (T).

4. The process according to claim 2, wherein said mathematical model is a dynamic model representable in a state space and comprises a state (x) comprising the second quantity.

5. The process according to claim 4, wherein the optimal control problem defines a linear-quadratic problem, whereby the solution to the optimal control problem is provided by a linear-quadratic regulator.

6. The process according to claim 4, wherein said state comprises a third quantity indicative of a linear speed (Vx) of said point (O).

7. The process according to claim 2, wherein the cost function (F) comprises at least one cost contribution multiplied by a relative weight in a frequency domain to filter the relative contribution.

8. The process according to claim 2, wherein the optimal control problem is defined for a finite time range and wherein the minimization of the cost function (F) is subject to at least one constraint, so that a further difference between a spent energy and an energy regenerated by the motor-generator (6) in the time range is zero or positive.

9. The process according to claim 1, wherein said linear acceleration (Ax) is horizontally oriented according to a driving direction of the vehicle (1).

10. The process according to claim 1, wherein said reference is a null scalar or vector.

11. The process according to claim 1, further comprising the step of i) filtering (101) a frequency contribution of the first signal (S1) before or during step c) (102) out of a frequency band.

12. An apparatus to control a drive assembly (2) of a vehicle (1), the drive assembly (2) comprising
a wheel hub unit (3),
a suspension (4), which couples the wheel hub unit (3) to a frame portion of the vehicle (1),
a drive axle (5), which is coupled to the wheel hub unit (3), and
an electric motor-generator (6) having a casing (16), which is carried by the axle (5) or by the wheel hub unit (3), and wherein the motor-generator (6) can be controlled so as to deliver a torque (T) to the wheel hub (3); the apparatus comprising a control unit (ECU), which is programmed to implement the process according to claim 1.

* * * * *